(12) United States Patent
Lin et al.

(10) Patent No.: US 12,526,013 B1
(45) Date of Patent: Jan. 13, 2026

(54) ESTABLISHING METHOD AND ESTABLISHING SYSTEM OF RECONFIGURABLE INTELLIGENT SURFACE RADIO FREQUENCY MODEL, AND RECEIVING POWER DISTRIBUTION CONSTRUCTING METHOD OF SIMULATED ELECTROMAGNETIC FIELD WITH RECONFIGURABLE INTELLIGENT SURFACE

(71) Applicant: NATIONAL CHUNG CHENG UNIVERSITY, Chiayi (TW)

(72) Inventors: Shih-Cheng Lin, Taitung County (TW); Sheng-Fuh Chang, Chiayi County (TW); Chia-Chan Chang, Chiayi (TW); Yuan-Chun Lin, Hsinchu County (TW); Wei-Lun Hsu, Tainan (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 0 days.

(21) Appl. No.: 18/814,608

(22) Filed: Aug. 26, 2024

(30) Foreign Application Priority Data

Jul. 9, 2024 (TW) ................................ 113125716

(51) Int. Cl.
*H04B 7/04* (2017.01)
(52) U.S. Cl.
CPC ................................ *H04B 7/04013* (2023.05)
(58) Field of Classification Search
CPC ................................................ H04B 7/04013
(Continued)

(56) References Cited

U.S. PATENT DOCUMENTS

2022/0059943 A1\* 2/2022 Saab ..................... H04B 7/0617
2022/0338023 A1\* 10/2022 Cao ....................... H04B 7/0632
(Continued)

FOREIGN PATENT DOCUMENTS

| CN | 116868518 A | 10/2023 |
| CN | 118282438 A | 7/2024 |
| WO | 2024/095750 A1 | 5/2024 |

OTHER PUBLICATIONS

Wei-Lun Hsu et al., "Deployment of Millimeter-Wave Reconfigurable Intelligent Surface in An Indoor Scenario Based On Ray-Tracing Simulation", 2023 General Assembly and Scientific Symposium of the International Union of Radio Science, dated on Aug. 19-26, 2023, Poster, Japan.

*Primary Examiner* — Emmanuel Bayard
(74) *Attorney, Agent, or Firm* — CKC & Partners Co., LLC

(57) ABSTRACT

A establishing method of a reconfigurable intelligent surface radio frequency model includes calculating a first power ratio between a first receiving antenna and a first transmitting antenna according to a first wireless transmission equation; calculating a second power ratio between a second receiving antenna and a second transmitting antenna according to a second wireless transmission equation, wherein a reconfigurable intelligent surface is disposed between the second transmitting antenna and the second receiving antenna, and separated from the second transmitting antenna by a reference distance; calculating the first power ratio, the second power ratio and a path loss corresponding to the reference distance to obtain a relay gain of the reconfigurable intelligent surface; and establishing the reconfigurable intelligent surface radio frequency model based on a loss correction value and the relay gain.

20 Claims, 10 Drawing Sheets
(3 of 10 Drawing Sheet(s) Filed in Color)

(58) Field of Classification Search
USPC .................................. 375/211, 267, 297–299
See application file for complete search history.

(56) References Cited

U.S. PATENT DOCUMENTS

| | | | |
|---|---|---|---|
| 2023/0007596 A1* | 1/2023 | Surbayrole | H04W 4/023 |
| 2023/0032511 A1* | 2/2023 | Horn | H04W 8/02 |
| 2023/0067470 A1* | 3/2023 | Sun | H04L 1/0076 |
| 2024/0113770 A1* | 4/2024 | Takizawa | H04W 52/52 |
| 2024/0333340 A1* | 10/2024 | Zuo | H04B 7/04013 |
| 2024/0381375 A1* | 11/2024 | Zhou | H04W 72/046 |

* cited by examiner

| Wireless Transmitter | | Reconfigurable Intelligent Surface | | |
|---|---|---|---|---|
| | | File | Import | Execute |
| Transmitting Power (dBm) | -5 | Relay Gain (dB) | -43 | |
| Antenna Type | Horn Antenna ⌄ | Antenna Type | Horn Antenna ⌄ | |
| Operating Frequency (GHz) | 28 | Operating Frequency (GHz) | 28 | |
| Size (cm) | 35*35 | Size (cm) | 35*35 | |
| Incidence Angle (deg) | 0 | Incidence Angle (deg) | 0 | |
| Reflection Angle (deg) | 0 | Reflection Angle (deg) | 0 | |
| | | Beam Width (deg) | 2.8 | |
| | | Reflection Coefficient | 1 | |
| | | Transmission Coefficient | 0 | |

ESTABLISHING METHOD AND ESTABLISHING SYSTEM OF RECONFIGURABLE INTELLIGENT SURFACE RADIO FREQUENCY MODEL, AND RECEIVING POWER DISTRIBUTION CONSTRUCTING METHOD OF SIMULATED ELECTROMAGNETIC FIELD WITH RECONFIGURABLE INTELLIGENT SURFACE

RELATED APPLICATIONS

This application claims priority to Taiwan Application Serial Number 113125716, filed Jul. 9, 2024, which is herein incorporated by reference.

BACKGROUND

Technical Field

The present disclosure relates to an establishing method and an establishing system of a radio frequency model, and a receiving power distribution constructing method of a simulated electromagnetic field. More particularly, the present disclosure relates to an establishing method and establishing system of a reconfigurable intelligent surface radio frequency model, and a receiving power distribution constructing method of a simulated electromagnetic field with a reconfigurable intelligent surface.

Description of Related Art

In mobile communication technologies, in order to improve transmission efficiency and system throughput and optimize the transmission quality of communication networks, more and more spectrum resources are used in the millimeter wave (mmWave) band. Although the mmWave band has a higher operating frequency, mmWave signals have larger path losses in the communication environment. In addition, the penetration and bypass capabilities of the mmWave signals are pretty limited, so the mmWave signals are easily blocked by environmental buildings to form communication blind zones. In order to solve the above problems, reconfigurable intelligent surface (RIS) is gradually emerging. RIS is a general term for a special surface that can change the propagation characteristics of electromagnetic waves and is composed of multiple passive units. By adjusting the amplitude and phase of each passive unit in RIS, the propagation of electromagnetic waves can be adjusted to achieve the effect of controlling the electromagnetic environment. However, RIS is difficult to apply to the existing electromagnetic field simulation software.

The existing electromagnetic field simulation software mainly uses ray tracing to simulate the electromagnetic wave power distribution in the three-dimensional environmental field, but it does not actually consider the physical structure and radio frequency model of RIS. Otherwise, the existing electromagnetic field simulation software only regards RIS as a simple mathematical model. Therefore, when simulating the electromagnetic field, the existing electromagnetic field simulation software cannot clearly understand the mutual coupling effect among the passive units and the boundary effect in the substrate of RIS, resulting in a difference between the simulated radiation field pattern and the real radiation field pattern. In view of this, how to make up for the shortages of the existing electromagnetic field simulation software has become has become an urgent problem that related industries want to solve currently.

SUMMARY

According to one aspect of the present disclosure, an establishing method of a reconfigurable intelligent surface radio frequency model includes calculating a first power ratio between a first receiving power of a first receiving antenna and a first transmitting power of a first transmitting antenna in a first wireless transmission module according to a first wireless transmission equation by a processor; calculating a second power ratio between a second receiving power of a second receiving antenna and a second transmitting power of a second transmitting antenna in a second wireless transmission module according to a second wireless transmission equation by the processor, wherein a reconfigurable intelligent surface is disposed between the second transmitting antenna and the second receiving antenna, and separated from the second transmitting antenna by a reference distance; calculating the first power ratio, the second power ratio and a path loss corresponding to the reference distance to obtain a relay gain of the reconfigurable intelligent surface by the processor; and establishing the reconfigurable intelligent surface radio frequency model based on a loss correction value and the relay gain by the processor, wherein the reconfigurable intelligent surface radio frequency model is configured to analyze a receiving power distribution of the second wireless transmission module.

According to another aspect of the present disclosure, an establishing system of a reconfigurable intelligent surface radio frequency model includes a first wireless transmission module, a second wireless transmission module, a memory and a processor. The first wireless transmission module includes a first transmitting antenna and a first receiving antenna. The first receiving antenna is signally connected to the first transmitting antenna. The second wireless transmission module includes a second transmitting antenna, a second receiving antenna and a reconfigurable intelligent surface. The second receiving antenna is signally connected to the second transmitting antenna. The reconfigurable intelligent surface is disposed between the second transmitting antenna and the second receiving antenna, and separated from the second transmitting antenna by a reference distance. The memory stores a first wireless transmission equation, a second wireless transmission equation and a loss correction value. The processor is connected to the memory, the first wireless transmission module and the second wireless transmission module, and configured to implement an establishing method of the reconfigurable intelligent surface radio frequency model. The establishing method includes calculating a first power ratio between a first receiving power of the first receiving antenna and a first transmitting power of the first transmitting antenna according to the first wireless transmission equation; calculating a second power ratio between a second receiving power of the second receiving antenna and a second transmitting power of the second transmitting antenna according to the second wireless transmission equation; calculating the first power ratio, the second power ratio and a path loss corresponding to the reference distance to obtain a relay gain of the reconfigurable intelligent surface; and establishing the reconfigurable intelligent surface radio frequency model based on the loss correction value and the relay gain, wherein the reconfigurable intelligent surface radio frequency model is configured to analyze a receiving power distribution of the second wireless transmission module.

According to yet another aspect of the present disclosure, a receiving power distribution constructing method of a simulated electromagnetic field with a reconfigurable intelligent surface includes calculating a first power ratio between a first receiving power of a first receiving antenna and a first transmitting power of a first transmitting antenna in a first wireless transmission module according to a first wireless transmission equation by a processor; calculating a second power ratio between a second receiving power of a second receiving antenna and a second transmitting power of a second transmitting antenna in a second wireless transmission module according to a second wireless transmission equation by the processor, wherein the reconfigurable intelligent surface is disposed between the second transmitting antenna and the second receiving antenna, and separated from the second transmitting antenna by a reference distance; calculating the first power ratio, the second power ratio and a path loss corresponding to the reference distance to obtain a relay gain of the reconfigurable intelligent surface by the processor; establishing a reconfigurable intelligent surface radio frequency model based on a loss correction value and the relay gain by the processor; importing a reconfigurable intelligent surface parameter and the reconfigurable intelligent surface radio frequency model corresponding to the reconfigurable intelligent surface into an electromagnetic field simulation software through a graphical user interface by the processor; executing the electromagnetic field simulation software to deploy the simulated electromagnetic field with the reconfigurable intelligent surface and a wireless transmitter based on the reconfigurable intelligent surface parameter by the processor; executing the electromagnetic field simulation software to create a first receiving power distribution corresponding to the wireless transmitter transmitting a simulated wireless signal by the processor; executing the electromagnetic field simulation software to create a second receiving power distribution corresponding to the simulated wireless signal re-radiated through the reconfigurable intelligent surface according to the reconfigurable intelligent surface parameter and the reconfigurable intelligent surface radio frequency model by the processor; and executing the electromagnetic field simulation software to superimpose the first receiving power distribution and the second receiving power distribution to construct a field receiving power distribution corresponding to the simulated electromagnetic field by the processor.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows:

FIG. 8 is a schematic view of a graphical user interface of the present disclosure.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
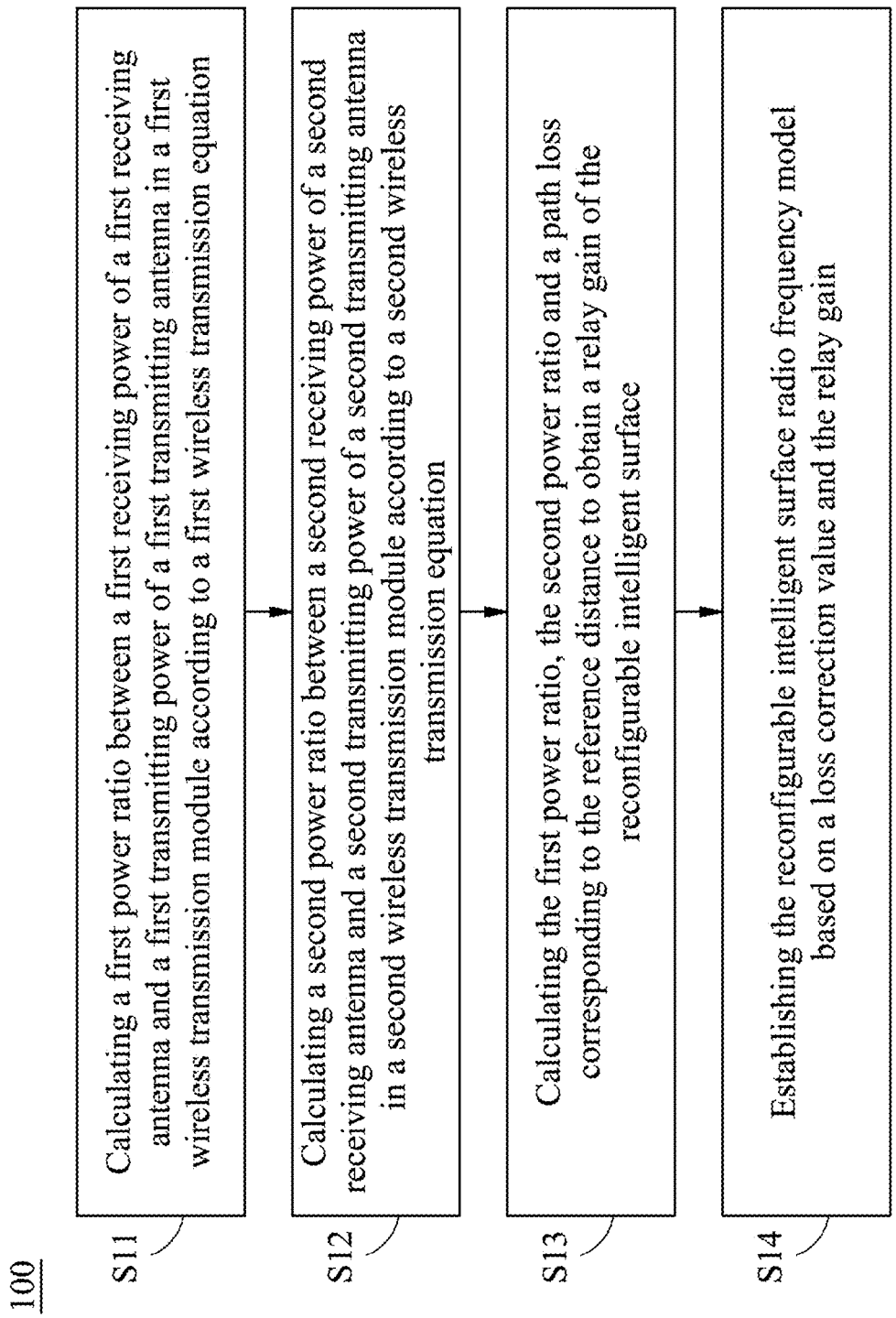
FIG. 1 is a flow chart of an establishing method of a reconfigurable intelligent surface radio frequency model according to a first embodiment of the present disclosure.
Figure 2:
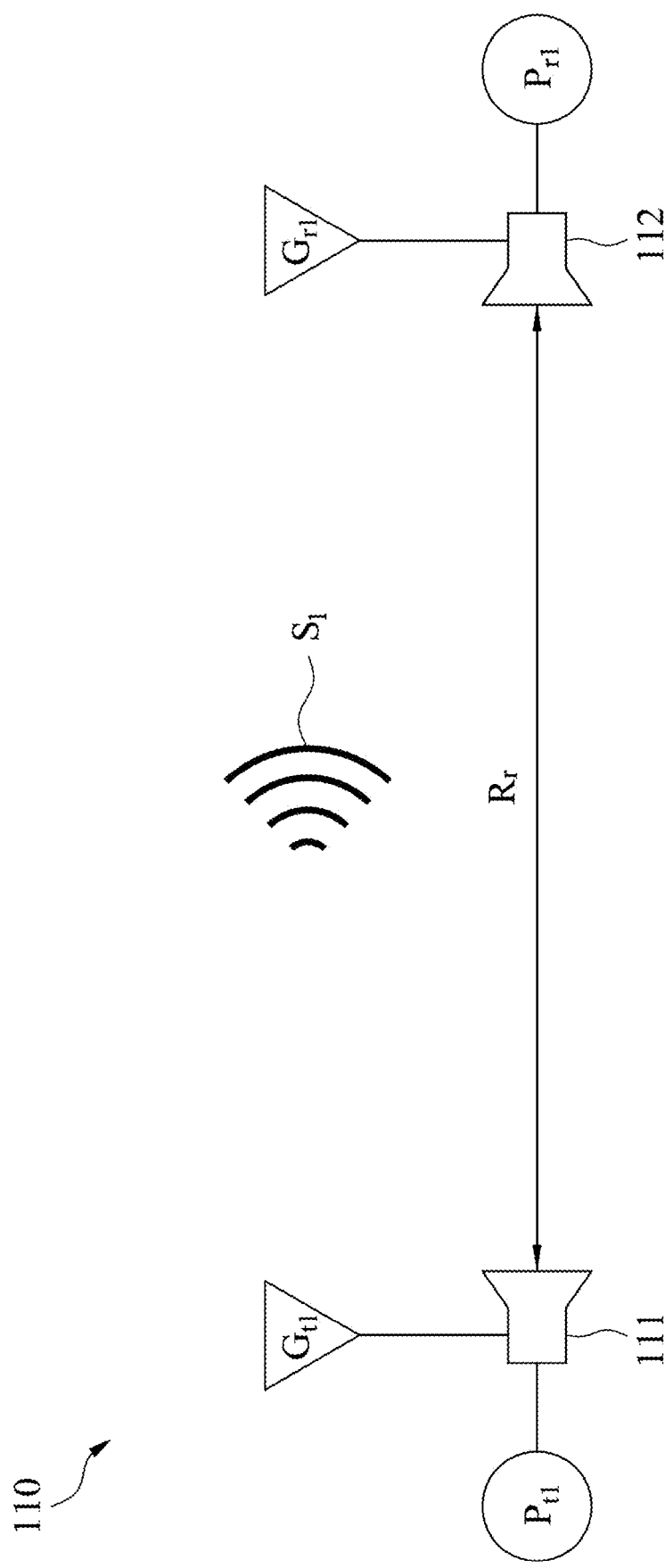
FIG. 2 is a schematic view of a first wireless transmission module of the present disclosure.
Figure 3:
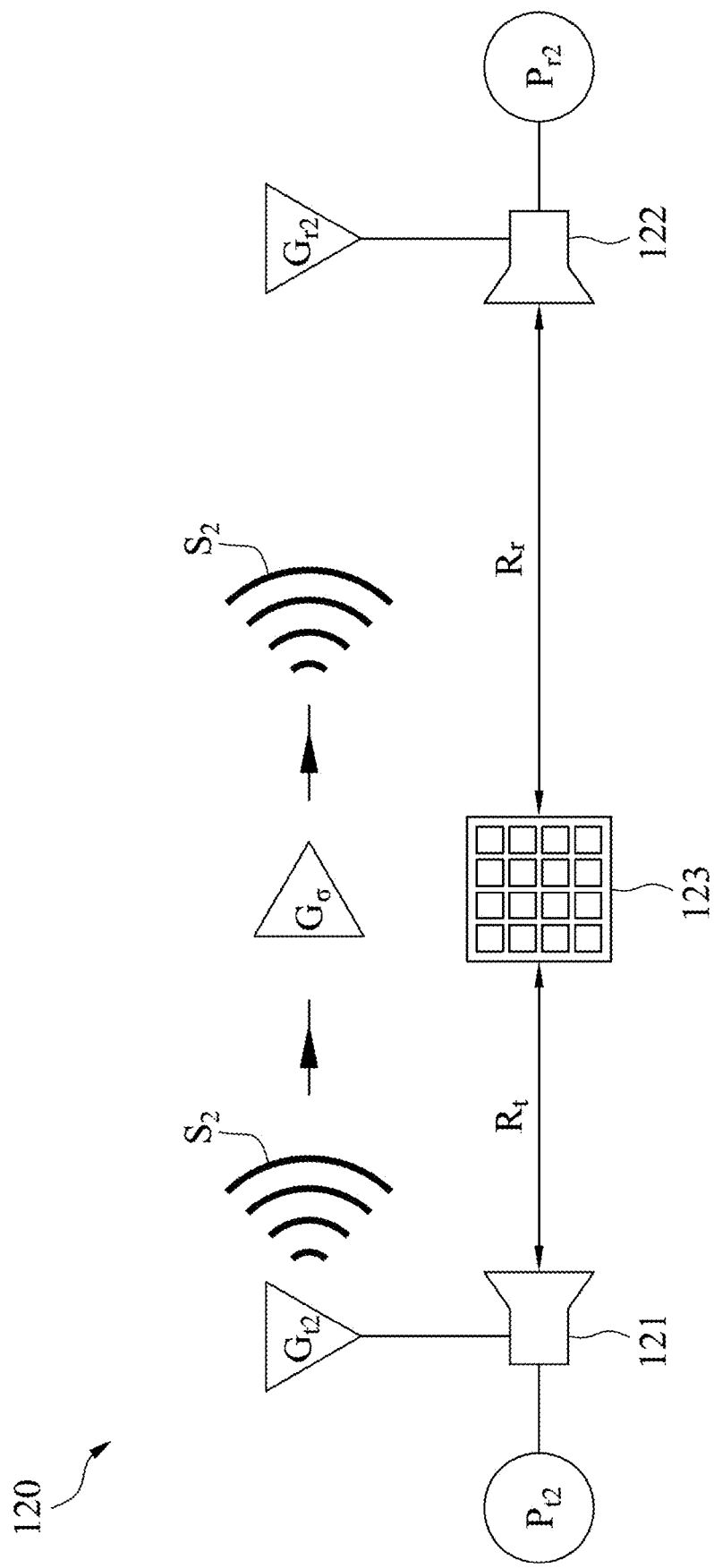
FIG. 3 is a schematic view of a second wireless transmission module of the present disclosure.

Please refer to FIGS. 1, 2 and 3. FIG. 1 is a flow chart of an establishing method 100 of a reconfigurable intelligent surface radio frequency model (hereinafter referred to as "the establishing method 100") according to a first embodiment of the present disclosure. FIG. 2 is a schematic view of a first wireless transmission module 110 of the present disclosure. FIG. 3 is a schematic view of a second wireless transmission module 120 of the present disclosure. As shown in FIGS. 1, 2 and 3, the establishing method 100 can be executed by an establishing system of the reconfigurable intelligent surface radio frequency model. The establishing system can include a first wireless transmission module 110, a second wireless transmission module 120, a memory and a processor. In FIG. 2, the first wireless transmission module 110 includes a first transmitting antenna 111 and a first receiving antenna 112. The first receiving antenna 112 is signally connected to the first transmitting antenna 111, and separated from the first transmitting antenna 111 by a given distance $R_r$. The first transmitting antenna 111 transmits a first wireless signal $S_1$ to the first receiving antenna 112. In FIG. 3, the second wireless transmission module 120 includes a second transmitting antenna 121, a second receiving antenna 122 and a reconfigurable intelligent surface 123. The second receiving antenna 122 is signally connected to the second transmitting antenna 121, and the reconfigurable intelligent surface 123 is disposed between the second transmitting antenna 121 and the second receiving antenna 122. The reconfigurable intelligent surface 123 is separated from the second transmitting antenna 121 by a reference distance $R_t$, and separated from the second receiving antenna 122 by the given distance $R_r$. The second transmitting antenna 121 transmits a second wireless signal $S_2$ to the reconfigurable intelligent surface 123, and the reconfigurable intelligent surface 123 re-radiates the second wireless signal $S_2$ to the second receiving antenna 122. The memory stores a first wireless transmission equation, a second wireless transmission equation, a path loss model, a loss correction value and a plurality of software codes encoded by a plurality of instruction sets. The processor is electrically connected to the memory, the first wireless transmission module 110 and the second wireless transmission module 120, and executes the software codes, so that the establishing method 100 can be automatically executed to establish the reconfigurable intelligent surface radio frequency model corresponding to the reconfigurable intelligent surface 123. The establishing method 100 can include the following Step S11, Step S12, Step S13 and Step S14.

Step S11: calculating a first power ratio between a first receiving power $P_{r1}$ of the first receiving antenna 112 and a first transmitting power $P_{t1}$ of the first transmitting antenna 111 (that is, a ratio of the first receiving power $P_{r1}$ divided by the first transmitting power $P_{t1}$) in the first wireless transmission module 110 according to the first wireless transmission equation by the processor. In Step S11, the first wireless transmission equation can be, but is not limited to, a friis equation. When the first transmitting power Put and a first transmitting gain $G_{t1}$ of the first transmitting antenna 111, the first receiving power $P_{r1}$ and a first receiving gain $G_{r1}$ of the first receiving antenna 112, the given distance $R_r$, and a wavelength of the first wireless signal $S_1$ are known, the processor can use the friis equation to calculate the first power ratio by moving terms from one side to the other side. Regarding the aforementioned powers and gains, the first transmitting power $P_{t1}$ is set by the processor, both the first transmitting gain $G_{t1}$ and the first receiving gain $G_{r1}$ are determined by the antenna used, the first receiving power $P_{r1}$ is measured by a measuring device, and the numerical data of each power and gain (including the given distance $R_r$) can be stored in the memory for running the first wireless transmission equation by the processor.

Step S12: calculating a second power ratio between a second receiving power $P_{r2}$ of the second receiving antenna 122 and a second transmitting power $P_{t2}$ of the second transmitting antenna 121 (that is, a ratio of the second receiving power $P_{r2}$ divided by the second transmitting power $P_{t2}$) in the second wireless transmission module 120 according to the second wireless transmission equation by the processor In Step S12, the second wireless transmission equation can be, but is not limited to, a radar equation. When the second transmitting power $P_{t2}$ and a second transmitting gain $G_{t2}$ of the second transmitting antenna 121, the second receiving power $P_{r2}$ and a second receiving gain $G_{r2}$ of the second receiving antenna 122, the given distance $R_r$, the reference distance $R_t$, a radar cross section (RCS) of the reconfigurable intelligent surface 123 and a wavelength of the second wireless signal $S_2$ are known, the processor can use the radar equation to calculate the second power ratio by moving terms from one side to the other side. Regarding the aforementioned powers and gains, the second transmitting power $P_{t2}$ and the radar cross section is set by the processor, both the second transmitting gain $G_{t2}$ and the second receiving gain $G_{r2}$ are determined by the antenna used, the second receiving power $P_{r2}$ is measured by the measuring device, and the numerical data of each power and gain (including the given distance $R_r$ and the reference distance $R_t$) can be stored in the memory for running the second wireless transmission equation by the processor.

Step S13: calculating the first power ratio, the second power ratio and a path loss corresponding to the reference distance $R_t$ to obtain a relay gain $G_o$ of the reconfigurable intelligent surface 123 by the processor. In this embodiment, the first transmitting antenna 111 is the same as the second transmitting antenna 121, and the first receiving antenna 112 is the same as the second receiving antenna 122. Since the first transmitting antenna 111 and the second transmitting antenna 121 use the same antenna (such as a horn antenna) and the first receiving antenna 112 and the second receiving antenna 122 use the same antenna (such as another horn antenna), the processor only needs to compare the first power ratio with the second power ratio (that is, subtracting the first power ratio from the second power ratio) to obtain the path loss corresponding to the reference distance $R_t$ and the relay gain $G_o$ of the reconfigurable intelligent surface 123. In Step S13, the processor can calculate the path loss corresponding to the reference distance $R_t$ according to the path loss model stored in the memory, and the path loss model can be, but is not limited to, a free-space path loss (FSPL) model. The processor subtracts the first power ratio from the second power ratio to generate a difference. The processor can obtain the relay gain $G_o$ of the reconfigurable intelligent surface 123 by calculating the difference and the path loss corresponding to the reference distance $R_t$, and then defines the relay gain $G_o$ as a re-radiation gain of the reconfigurable intelligent surface 123.

Step S14: establishing the reconfigurable intelligent surface radio frequency model based on the loss correction value stored in the memory and the relay gain $G_o$ of the reconfigurable intelligent surface 123 by the processor. It should be noted that, when discussing the characteristics of an electromagnetic field with a reconfigurable intelligent surface (RIS) and an antenna in the electromagnetic wave transmission technologies, the antenna and the reconfigurable intelligent surface need to be included in the calculation of radiation gain, but the existing electromagnetic field simulation software mainly uses metal surfaces or patch antennas as the benchmark for a reconfigurable intelligent surface simulation model to estimate field receiving power distributions, and the reflection signal built in the aforementioned reconfigurable intelligent surface follows Snell's Law. However, there is the mutual coupling effect among the passive units of the reconfigurable intelligent surface. If the simulation model of the passive unit is not considered, it is easy to cause errors between the measurement data and the simulation data. As a result, the existing electromagnetic field simulation software cannot intuitively obtain the individual gain of the reconfigurable intelligent surface, thereby affecting the accuracy of the electromagnetic field estimation. Therefore, the RIS gain defined in the prior art covers the gain of the reconfigurable intelligent surface itself, plus the gain of the antenna and the path loss.

Different from the prior art, the establishing method 100 of the present disclosure uses the first and second wireless transmission equations to calculate the first receiving power $P_{r1}$ of the first wireless transmission module 110 without the reconfigurable intelligent surface 123 and calculate the second receiving power $P_{r2}$ of the second wireless transmission module 120 with the reconfigurable intelligent surface 123, respectively. Then, the relay gain $G_\sigma$ is obtained through the link budget of the first wireless transmission module 110 and the second wireless transmission module 120, and an error term is corrected based on the loss correction value to establish the reconfigurable intelligent surface radio frequency model with high accuracy. In the wireless communication system, the link budget is a calculation of the communication system components that a wireless signal passes through in the process from the transmitting antenna to the receiving antenna, and the power of each node in the link can be obtained. In addition, the relay gain $G_\sigma$ defined in the present disclosure is to independently determine the reconfigurable intelligent surface 123 and calculate the re-radiation gain of the reconfigurable intelligent surface 123 based on the radar cross section.

Therefore, the reconfigurable intelligent surface radio frequency model of the present disclosure does not have the problem of mutual coupling effect, and the reconfigurable intelligent surface radio frequency model can be configured to analyze a receiving power distribution of the second wireless transmission module 120. Furthermore, the processor only needs to embed the reconfigurable intelligent surface radio frequency model into an electromagnetic field simulation software (such as Wireless InSite), and then the processor can construct a receiving power distribution of a simulated wireless signal re-radiated by the reconfigurable intelligent surface 123 through the reconfigurable intelligent surface radio frequency model and the electromagnetic field simulation software. Therefore, a simulated electromagnetic field with the reconfigurable intelligent surface 123 can be estimated with high accuracy. The aforementioned receiving power distribution can be a distribution of reference signal receiving power (RSRP), but the present disclosure is not limited thereto.

In some embodiments, the establishing method 100 can further include the following steps: setting the first transmitting power $P_{t1}$ of the first transmitting antenna 111 by the processor before calculating the first power ratio (i.e., before executing step S11); transmitting the first wireless signal $S_1$ to the first receiving antenna 112 based on the first transmitting power $P_{t1}$ by the first transmitting antenna 111; and measuring the first wireless signal $S_1$ received by the first receiving antenna 112 from the first transmitting antenna 111 by the measuring device to generate the first receiving power $P_{r1}$ of the first receiving antenna 112.

The first wireless transmission equation (i.e., the friis equation) can include the first transmitting power Pt and the first transmitting gain $G_{t1}$ of the first transmitting antenna 111, the first receiving power $P_{r1}$ and the first receiving gain $G_{r1}$ of the first receiving antenna 112, the given distance $R_r$, and the wavelength of the first wireless signal $S_1$, and the following equations (1) and (2) are satisfied:

$$P_r = \frac{P_{tFriss} \cdot G_t \cdot G_r \cdot \lambda^2}{(4\pi \cdot R_r)^2}; \quad (1)$$

$$\frac{P_r}{P_{tFriss}} = \frac{G_t \cdot G_r \cdot \lambda^2}{(4\pi \cdot R_r)^2}. \quad (2)$$

In the equations (1) and (2), $P_r$ is the first receiving power $P_{r1}$, $P_{tFriss}$ is the first transmitting power $P_{t1}$, $G_t$ is the first transmitting gain $G_{t1}$, $G_r$ is the first receiving gain $G_{r1}$, $R_r$ is the given distance $R_r$, and $\lambda$ is the wavelength of the first wireless signal $S_1$, and $$\frac{P_r}{P_{tFriss}}$$

is the first power ratio.

In some embodiments, the establishing method 100 can further include the following steps: setting the second transmitting power $P_{t2}$ of the second transmitting antenna 121 by the processor before calculating the second power ratio (i.e., before executing step S12); transmitting the second wireless signal $S_2$ to the reconfigurable intelligent surface 123 based on the second transmitting power $P_{t2}$ by the second transmitting antenna 121; re-radiating the second wireless signal $S_2$ to the second receiving antenna 122 by the reconfigurable intelligent surface 123; and measuring the second wireless signal $S_2$ received by the second receiving antenna 122 from the reconfigurable intelligent surface 123 to generate the second receiving power $P_{r2}$ of the second receiving antenna 122 by the measuring device. The aforementioned measuring device can be, but is not limited to, a network analyzer (NA).

The second wireless transmission equation (i.e., the radar equation) can include the second transmitting power $P_{t2}$ and the second transmitting gain $G_{t2}$ of the second transmitting antenna 121, the second receiving power $P_{r2}$ and the second receiving gain $G_{r2}$ of the second receiving antenna 122, the given distance $R_r$, the reference distance $R_t$, the radar cross section of the reconfigurable intelligent surface 123 and the wavelength of the second wireless signal $S_2$, and the following equations (3) and (4) are satisfied:

$$P_r = \frac{P_{tRadar} \cdot G_t \cdot G_r \cdot \lambda^2 \cdot \sigma}{(4\pi)^3 \cdot R_t^2 \cdot R_r^2}; \quad (3)$$

$$\frac{P_r}{P_{tRadar}} = \frac{G_t \cdot G_r \cdot \lambda^2 \cdot \sigma}{(4\pi)^3 \cdot R_t^2 \cdot R_r^2}. \quad (4)$$

In the equations (3) and (4), $P_r$ is the second receiving power $P_{r2}$, $P_{tRadar}$ is the second transmitting power $P_{t2}$, $G_t$ is the second transmitting gain $G_{t2}$, $G_r$ is the second receiving gain $G_{r2}$, $R_r$ is the given distance $R_r$, $R_t$ is the reference distance $R_t$, and $\lambda$ is the wavelength of the second wireless signal $S_2$, $\sigma$ is the radar cross section of the reconfigurable intelligent surface 123, and $$\frac{P_r}{P_{tRadar}}$$

is the second power ratio.

In detail, the energy re-radiated through the reconfigurable intelligent surface 123 (i.e., the second wireless signal $S_2$ re-radiated through the reconfigurable intelligent surface 123) can be analyzed by using the radar cross section; in other words, the establishing method 100 is to represent the relay gain Go of the reconfigurable intelligent surface 123 based on the radar cross section of the reconfigurable intelligent surface 123. In the principle of the radar equation, electromagnetic waves incident on an object to be tested (i.e., the reconfigurable intelligent surface 123) can obtain the scattering energy of the object to be tested, and the gain of the object to be tested is analyzed by extracting the scattered energy, and a corresponding model is established to estimate its characteristics. Therefore, the radar cross section can be configured to describe the scattering energy of electromagnetic waves by the object to be tested, and its calculation method is determined by the cross-sectional area of reflection. The unit of the radar cross section is square meters (m²). The numerical value of the radar cross section depends on the shape, size, material medium, polarization direction, incident angle and reflection angle of the object to be tested. The larger radar cross section represents that the object to be tested scatters more power in a given direction, making it easier to detect by the radar system. The radar cross section can be expressed by a mathematical formula, and the mathematical formula is derived from Maxwell's Equations, electromagnetic scattering theory and boundary conditions, and not described again herein.

In some embodiments, Step S13 can include the following steps: subtracting the first power ratio $$\frac{P_r}{(P_{tFriss})}$$

from the second power ratio $$\frac{P_r}{(P_{tRadar})}$$

to generate a difference $$\left(\frac{P_r}{P_{tRadar}} - \frac{P_r}{P_{tFriss}}\right)$$

by the processor; calculating the path loss corresponding to the reference distance $R_t$ according to the path loss model by the processor; and calculating the relay gain $G_\sigma$ according to the difference and the path loss by the processor.

Furthermore, after the processor subtracts the equation (2) from the equation (4), that is, comparing the link budget of the second wireless transmission module 120 in FIG. 3 with the link budget of the first wireless transmission module 110 in FIG. 2, a difference between the equations (2) and (4) is the path loss corresponding to the reference distance $R_t$ and the relay gain $G_\sigma$ of the reconfigurable intelligent surface 123. The processor uses the path loss model (i.e., FSPL model) to obtain the path loss to extract the relay gain $G_\sigma$, and then divides the relay gain $G_\sigma$ by 4π (that is, performing data normalization on the relay gain $G_\sigma$) to obtain a normalized radar cross section (Normalized RCS), and its unit can be decibel (dB). The above calculating processes can conform to the following equations (5) and (6):

$$\frac{P_r}{P_{tRadar}} - \frac{P_r}{P_{tFriss}} = \left(\frac{\lambda}{4\pi \cdot R_t}\right)^2 \cdot \frac{4\pi \cdot \sigma}{\lambda^2} = -FSPL_{R_t}(dB) + G_\sigma(dB); \quad (5)$$

$$G_\sigma(dB) = \frac{P_r}{P_{tRadar}} - \frac{P_r}{P_{tFriss}} + FSPL_{R_t}(dB). \quad (6)$$

In the equations (5) and (6), $FSPL_{R_t}$ (dB) is the path loss corresponding to the reference distance $R_t$. $G_\sigma$ (dB) is the normalized radar cross section, which can be defined as the relay gain $G_\sigma$ of the reconfigurable intelligent surface 123. It can be seen from the equation (6) that the relay gain $G_\sigma$ can be the sum of the second power ratio minus the first power ratio plus the path loss. The path loss model can include the reference distance $R_t$ and a frequency of the second wireless signal $S_2$ transmitted by the second transmitting antenna 121, and the following equation (7) is satisfied:

$$FSPL_{R_t}(dB) = 20\log(R_t) + 20\log(f) + 20\log\left(\frac{4\pi}{c}\right). \quad (7)$$

In the equation (7), $R_t$ is the reference distance $R_t$, f is the frequency of the second wireless signal $S_2$, and c is a speed of light, and $FSPL_{R_t}$ (dB) is the path loss corresponding to the reference distance $R_t$.

In some embodiments, Step S14 can include the following steps: reading the loss correction value from the memory, and adjusting the path loss corresponding to the reference distance $R_t$ according to the loss correction value to generate a corrected path loss by the processor; and adding the corrected path loss and the difference of subtracting the first power ratio from the second power ratio to generate a corrected relay gain, and establishing the reconfigurable intelligent surface radio frequency model according to the corrected relay gain. The corrected path loss and corrected relay gain can respectively conform to the following equations (8) and (9):

$$PL(dB) = FSPL_{R_t}(dB) + \Delta d(dB); \quad (8)$$

$$G_{PL}(dB) = \frac{P_r}{P_{tRadar}} - \frac{P_r}{P_{tFriss}} + [FSPL_{R_t}(dB) + \Delta d(dB)] \\ = G_\sigma(dB) + \Delta d(dB) \quad (9)$$

In the equations (8) and (9), PL (dB) is the corrected path loss, $FSPL_{R_t}$ (dB) is the path loss corresponding to the reference distance $R_t$, $\Delta d$ (dB) is the loss correction value, $$\frac{P_r}{P_{tRadar}} - \frac{P_r}{P_{tFriss}}$$

is the difference of subtracting the first power ratio from the second power ratio, $G_{PL}$ (dB) is the corrected relay gain. In detail, the path loss model calculates the path loss corresponding to the reference distance $R_t$ under vacuum lossless condition. If electromagnetic simulation analysis software, such as high frequency structure simulator (HFSS), is used to simulate the path loss at the reference distance $R_t$, there will be the error term between the result generated by the path loss model and the result generated by HFSS, and the error term varies depending on the distance. In Step S14, in order to consider the error term, the processor adjusts the path loss estimated by the path loss model through the loss correction value (as shown in the equation (8)), which is equivalent to adjust the relay gain $G_\sigma$ through the loss correction value (as shown in the equation (9)). Therefore, the corrected relay gain better fits the real measurement results.

Table 1 lists a plurality of values corresponding to the loss correction values ($\Delta d$ (dB)) of the present disclosure at different distances and the path losses obtained through model estimation (i.e., $FSPL_{R_t}$ (dB)), software simulation (i.e., HFSS (dB)) and actual measurement (i.e., Meas. (dB)), but the present disclosure is not limited to the values.

TABLE 1

| Distance (m) | $FSPL_{R_t}$ (dB) | HFSS(dB) | Meas.(dB) | Δd(dB) |
|---|---|---|---|---|
| 0.4 | 53.43 | 55.70 | 56.8 | 3.37 |
| 1 | 61.39 | 63.33 | 63.8 | 2.41 |
| 2 | 67.41 | 69.21 | 69.3 | 1.89 |
| 2.9 | 70.63 | 72.08 | 72.7 | 2.07 |
| 3 | 70.93 | 72.37 | 72.9 | 1.97 |
| 3.5 | 72.27 | 73.66 | 74.0 | 1.73 |
| 3.8 | 72.99 | 74.38 | 74.8 | 1.81 |

In some embodiments, the ON/OFF states of the diodes on the passive units of the reconfigurable intelligent surface 123 can be controlled by applying a voltage to change the phase distribution of the radiation layer in the passive unit, so that the reconfigurable intelligent surface 123 has the ability to change the beam direction and beamforming function at specific locations. Therefore, the direction of the re-radiation field pattern of the reconfigurable intelligent surface 123 can be controlled by applying voltage, and its characteristics are represented by the radar cross section. When the reconfigurable intelligent surface 123 receives a wireless signal, different scattering signals are generated based on various factors, such as the current incident angle, reflection angle, frequency, and number of the passive units.

Table 2 lists a plurality of values of the corrected relay gain (i.e., $G_{PL}$ (dB)) corresponding to the reconfigurable intelligent surface 123 at different reflection angles (i.e., Refl.), but the present disclosure is not limited to the values.

TABLE 2

| Refl. | $\frac{P_r}{P_{tRadar}}$ (dB) | $\frac{P_r}{P_{tFriss}}$ (dB) | $FSPL_{R_t}$ (dB) | Δd(dB) | $G_{PL}$(dB) |
|---|---|---|---|---|---|
| 10° | −61.5 | −65.58 | 55.53 | 2 | 61.61 |
| 20° | −61.78 | | | | 61.33 |
| 30° | −62.16 | | | | 60.95 |
| 40° | −62.95 | | | | 60.16 |
| 50° | −64.24 | | | | 58.87 |

Thus, when performing signal estimation, the shortcomings of insufficient theory in the prior art can be solved by combining the reconfigurable intelligent surface radio frequency model established by the establishing method 100 with the electromagnetic field simulation software, and the reconfigurable intelligent surface radio frequency model of the present disclosure can make the simulation of the reconfigurable intelligent surface 123 closer to the actual measured values.

Figure 4:
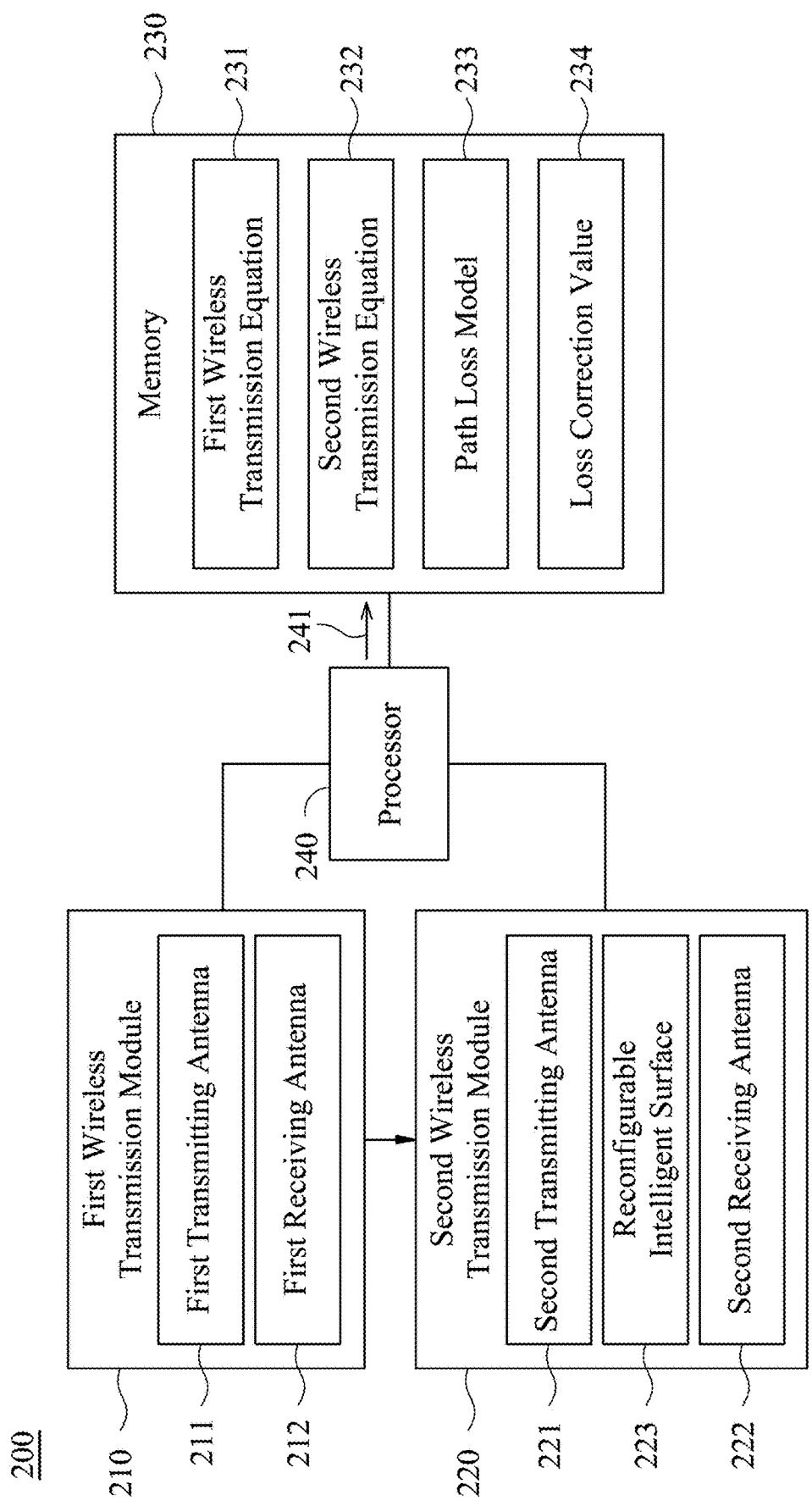
FIG. 4 is a block diagram of an establishing system of a reconfigurable intelligent surface radio frequency model according to a second embodiment of the present disclosure.

Please refer to FIGS. 1 and 4. FIG. 4 is a block diagram of an establishing system 200 of a reconfigurable intelligent surface radio frequency model (hereinafter referred to as "the establishing system 200") according to a second embodiment of the present disclosure. As shown in FIG. 4, the establishing system 200 includes a first wireless transmission module 210, a second wireless transmission module 220, a memory 230 and a processor 240. The first wireless transmission module 210 includes a first transmitting antenna 211 and a first receiving antenna 212. The second wireless transmission module 220 includes a second transmitting antenna 221, a second receiving antenna 222 and a reconfigurable intelligent surface 223. The memory 230 stores a first wireless transmission equation 231, a second wireless transmission equation 232, a path loss model 233 and a loss correction value 234. The processor 240 is electrically connected to the memory 230, the first wireless transmission module 210 and the second wireless transmission module 220, and configured to implement the establishing method 100. The components in the establishing system 200 are the same as the corresponding components in the establishing method 100 of the first embodiment, so the details are not described again herein.

In some embodiments, the memory 230 can be a machine-readable medium, which can be but is not limited to, a random access memory (RAM), a read-only memory (ROM), a compact disc read-only memory (CD-ROM), a flash memory, a hard disk drive, a magnetic tape, a floppy disk or an optical data storage device. The processor 240 can be, but is not limited to, a digital signal processor (DSP), a micro processing unit (MPU), a central processing unit (CPU) or other electronic processors, but the present disclosure is not limited thereto. Thus, the establishing system 200 of the present disclosure can extract the relay gain of the reconfigurable intelligent surface 223 through the link budget, and adjust the relay gain based on the loss correction value 234 to establish a reconfigurable intelligent surface radio frequency model 241, and the processor 240 can store the reconfigurable intelligent surface radio frequency model 241 in the memory 230. When the processor 240 imports the reconfigurable intelligent surface radio frequency model 241 into an electromagnetic field simulation software, the electromagnetic field simulation software can perform highly accurate electromagnetic field estimation on the simulated electromagnetic field with the reconfigurable intelligent surface.

Figure 5:
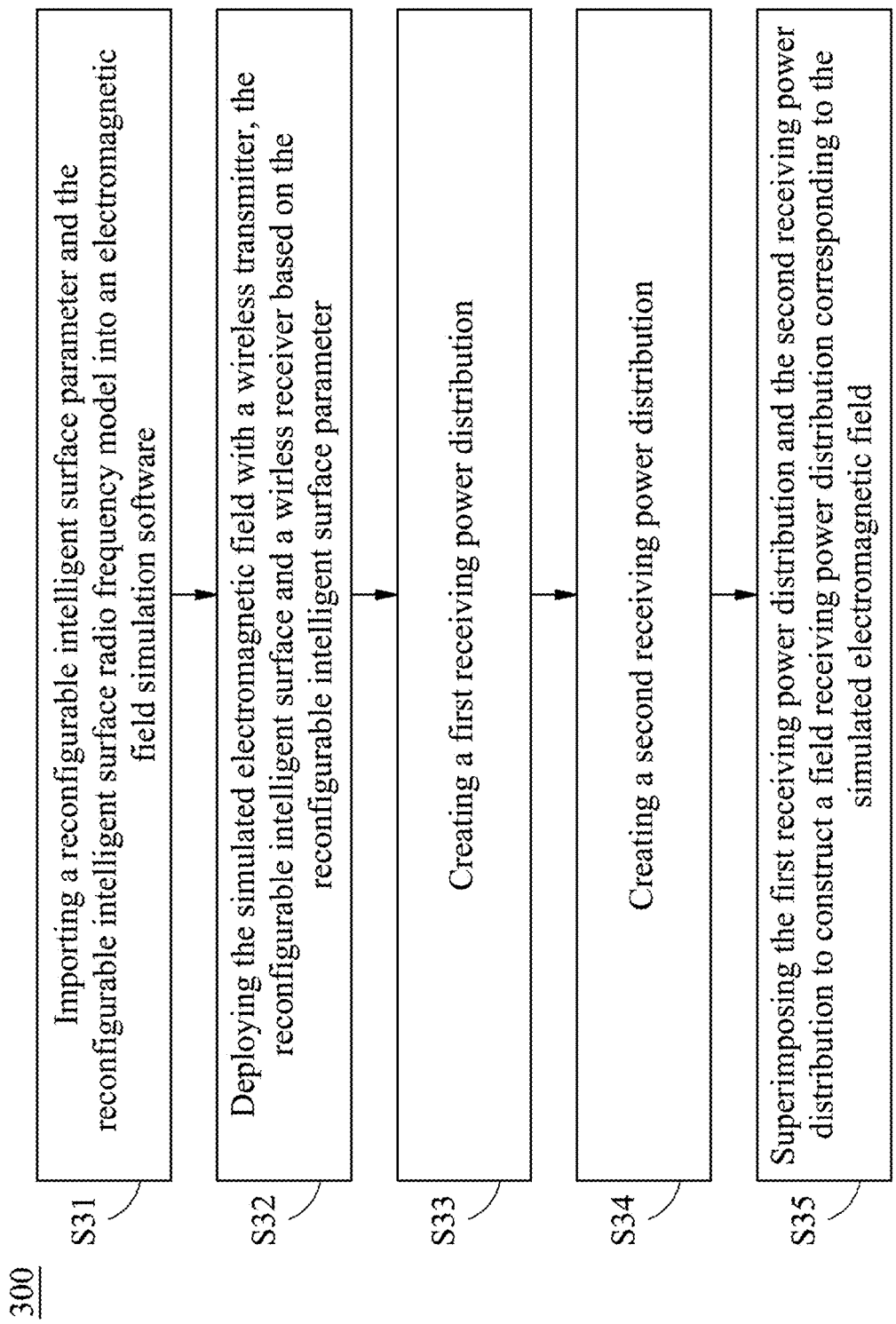
FIG. 5 is a flow chart of a receiving power distribution constructing method of a simulated electromagnetic field with a reconfigurable intelligent surface according to a third embodiment of the present disclosure.
Figure 6:
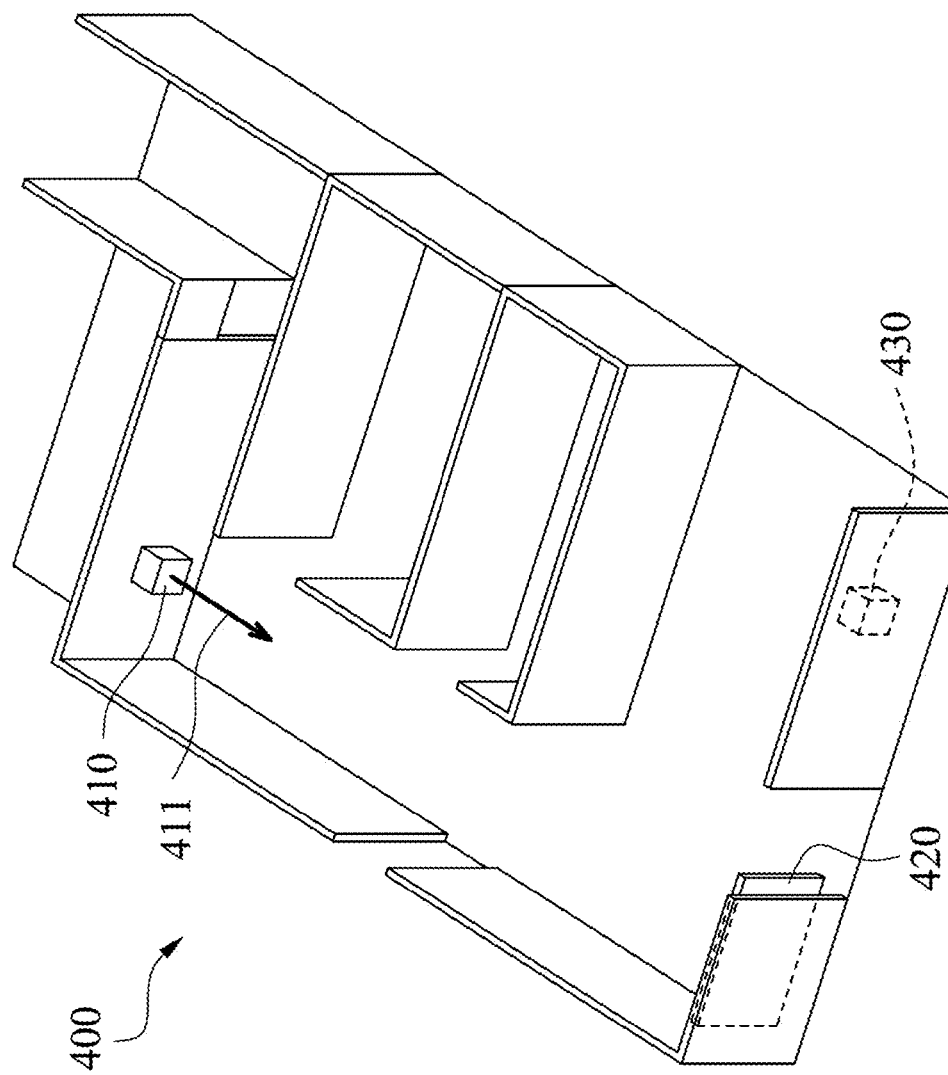
FIG. 6 is a three-dimensional schematic view of the simulated electromagnetic field of the present disclosure.
Figure 7A:
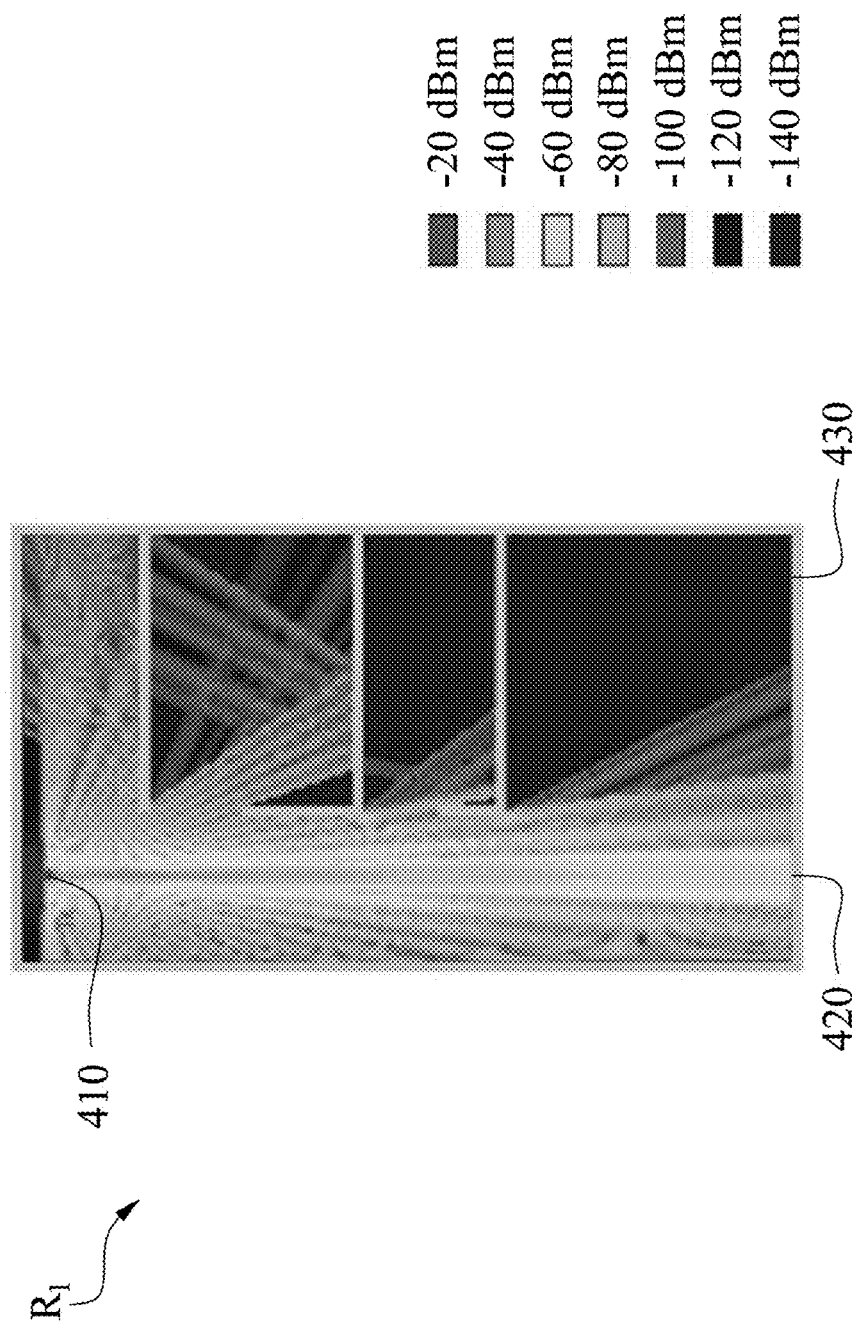
FIG. 7A is a schematic view of a first receiving power distribution of a wireless transmitter to the reconfigurable intelligent surface in the simulated electromagnetic field of FIG. 6.
Figure 7B:
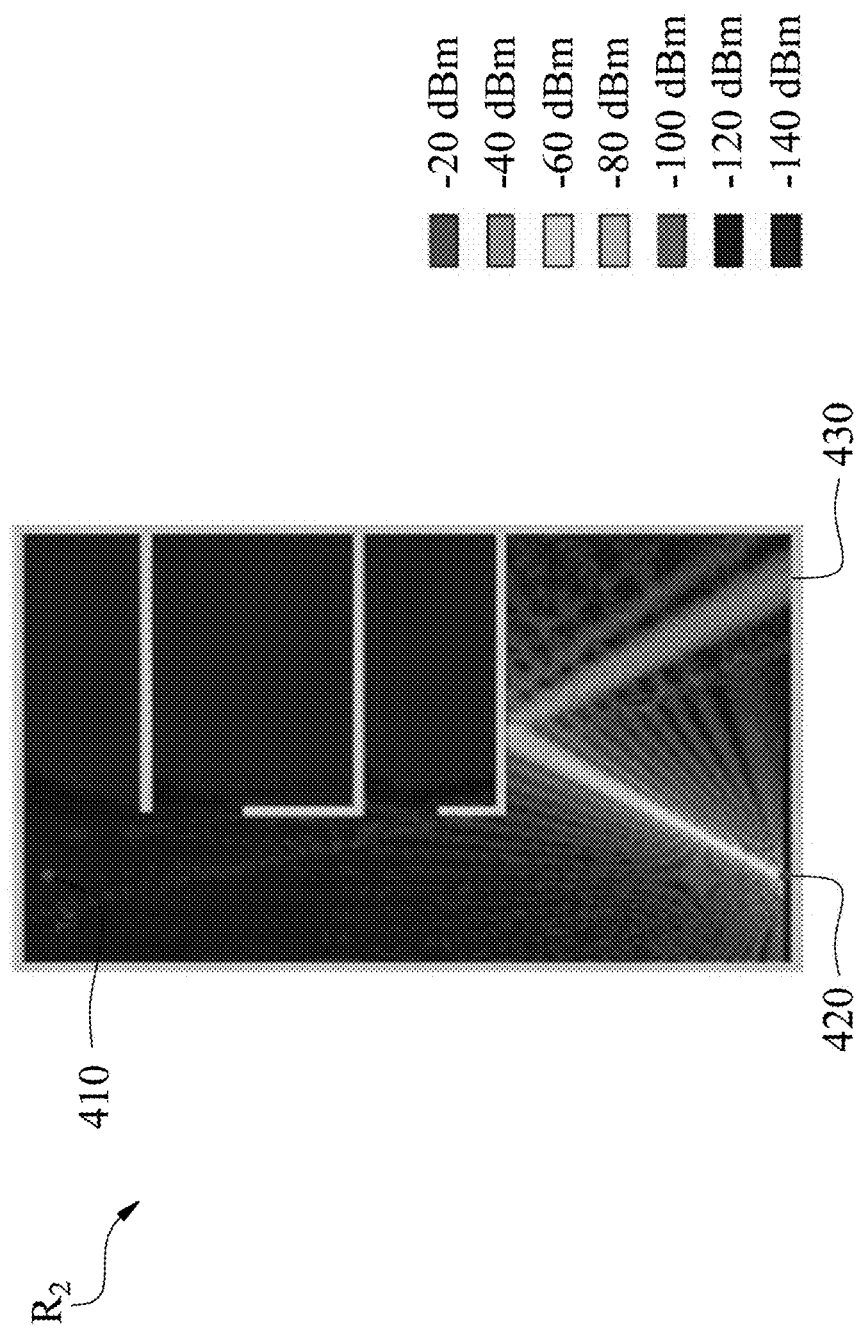
FIG. 7B is a schematic view of a second receiving power distribution of the reconfigurable intelligent surface to a wireless receiver in the simulated electromagnetic field of FIG. 6.
Figure 7C:
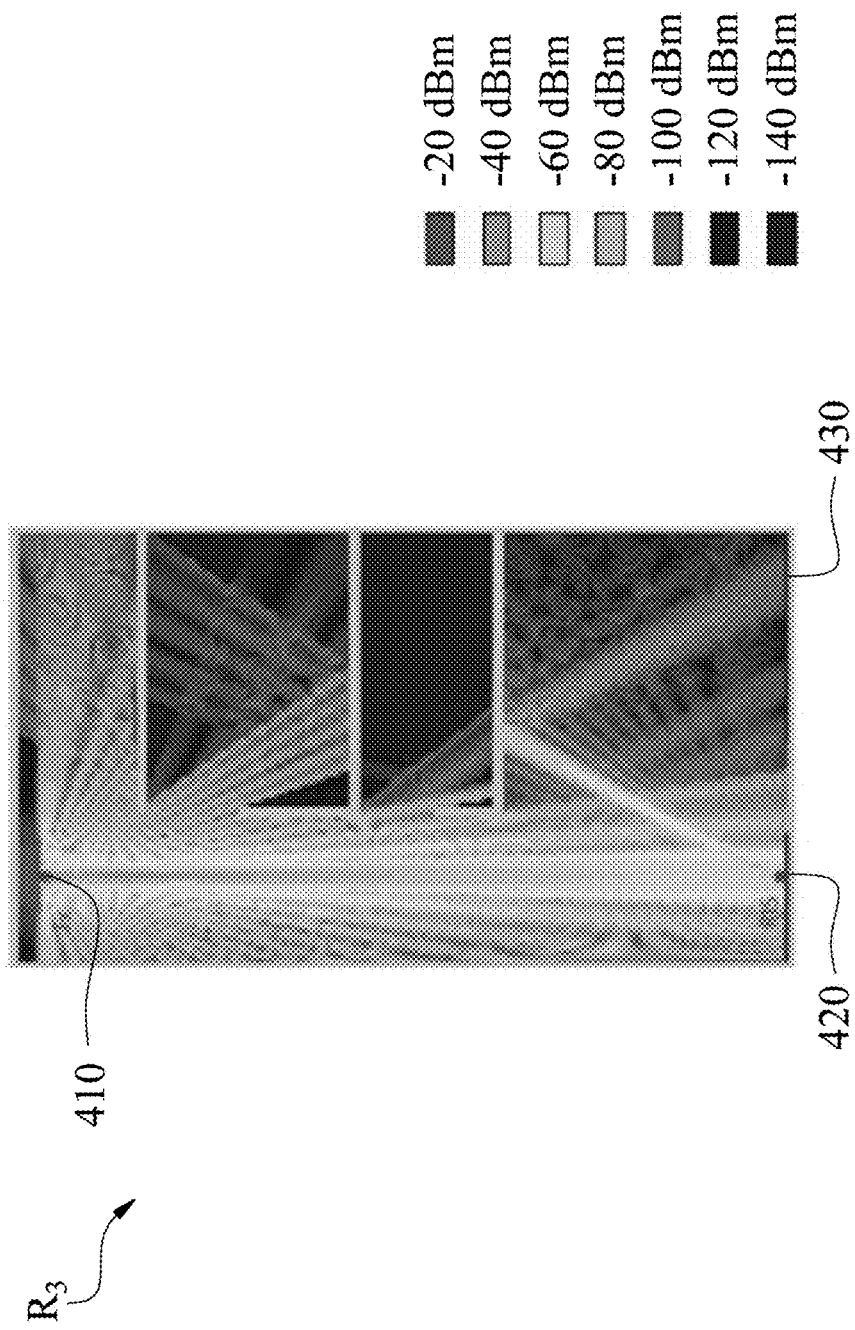
FIG. 7C is a schematic view of a field receiving power distribution of the wireless transmitter to the reconfigurable intelligent surface to the wireless receiver in the simulated electromagnetic field of FIG. 6.

Please refer to FIGS. 1, 5, 6, 7A, 7B, 7C and 8. FIG. 5 is a flow chart of a receiving power distribution constructing method 300 of a simulated electromagnetic field with a reconfigurable intelligent surface (hereinafter referred to as "the receiving power distribution constructing method 300") according to a third embodiment of the present disclosure. FIG. 6 is a three-dimensional schematic view of the simulated electromagnetic field 400 of the present disclosure. FIG. 7A is a schematic view of a first receiving power distribution $R_1$ of a wireless transmitter 410 to a reconfigurable intelligent surface 420 in the simulated electromagnetic field 400 of FIG. 6. FIG. 7B is a schematic view of a second receiving power distribution $R_2$ of the reconfigurable intelligent surface 420 to a wireless receiver 430 in the simulated electromagnetic field 400 of FIG. 6. FIG. 7C is a schematic view of a field receiving power distribution $R_3$ of the wireless transmitter 410 to the reconfigurable intelligent surface 420 to the wireless receiver 430 in the simulated electromagnetic field 400 of FIG. 6. FIG. 8 is a schematic view of a graphical user interface (GUI) 500 of the present disclosure. The receiving power distribution constructing method 300 can be applied to an electromagnetic field simulation software and configured to construct the field receiving power distribution $R_3$ corresponding to the simulated electromagnetic field 400. As shown in FIGS. 1, 5, 6, 7A, 7B, 7C and 8, the receiving power distribution constructing method 300 can include the following Step S31, Step S32, Step S33, Step S34 and Step S35. In other embodiments, before executing step S31, the receiving power distribution constructing method 300 can further include Step S11, Step S12, Step S13 and Step S14 in FIG. 1, the details of which are not described again herein.

Step S31: importing/embedding a reconfigurable intelligent surface parameter 510 and the reconfigurable intelligent surface radio frequency model corresponding to the reconfigurable intelligent surface 420 into an electromagnetic field simulation software through the graphical user interface 500 by the processor. The electromagnetic field simulation software can be, but is not limited to, Wireless InSite.

Wireless InSite is a simulation software mainly used to simulate field power distribution, path loss and communication transmission, and uses ray tracing to perform reflection, transmission and scattering calculations. The reconfigurable intelligent surface radio frequency model in the third embodiment is the reconfigurable intelligent surface radio frequency model established by the establishing method 100 of FIG. 1 in the first embodiment.

Step S32: executing the electromagnetic field simulation software to deploy the simulated electromagnetic field 400 with the wireless transmitter 410, the reconfigurable intelligent surface 420 and the wireless receiver 430 based on the reconfigurable intelligent surface parameter 510 by the processor. In FIG. 6, the reconfigurable intelligent surface 420 is aligned with the wireless transmitter 410, and the wireless transmitter 410 transmits a simulated wireless signal 411 toward the reconfigurable intelligent surface 420. The reconfigurable intelligent surface 420 re-radiates the simulated wireless signal 411, so that the simulated wireless signal 411 is reflected to the wireless receiver 430 through a wall (its reference numeral is omitted).

Step S33: executing the electromagnetic field simulation software to create the first receiving power distribution $R_1$ corresponding to the wireless transmitter 410 transmitting the simulated wireless signal 411 by the processor. In FIG. 7A, the reconfigurable intelligent surface 420 has a receiving mode and a re-radiating mode. When the reconfigurable intelligent surface 420 is set to operate in the receiving mode, it can be seen from the first receiving power distribution $R_1$ that the simulated wireless signal 411 is not re-radiated by the reconfigurable intelligent surface 420, resulting in blind zone formed at non-direct-view region.

Step S34: executing the electromagnetic field simulation software to create the second receiving power distribution $R_2$ corresponding to the simulated wireless signal 411 re-radiated through the reconfigurable intelligent surface 420 according to the reconfigurable intelligent surface parameter 510 and the reconfigurable intelligent surface radio frequency model by the processor. In FIG. 7B, when the reconfigurable intelligent surface 420 is set to operate in the re-radiating mode, the electromagnetic field simulation software uses the array factor of the reconfigurable intelligent surface 420 to calculate the array field pattern of the reconfigurable intelligent surface 420 at first, and then combines it with the relay gain of the reconfigurable intelligent surface 420 to obtain the second receiving power distribution $R_2$ of the simulated wireless signal 411 re-radiated by the reconfigurable intelligent surface 420.

Step S35: executing the electromagnetic field simulation software to superimpose the first receiving power distribution $R_1$ and the second receiving power distribution $R_2$ to construct the field receiving power distribution $R_3$ corresponding to the simulated electromagnetic field 400 by the processor. In FIG. 7C, the electromagnetic field simulation software can superimpose the signal magnitudes and phases of the first receiving power distribution $R_1$ and the second receiving power distribution $R_2$ to obtain the field receiving power distribution $R_3$. In some embodiments, each of the first receiving power distribution $R_1$, the second receiving power distribution $R_2$ and the field receiving power distribution $R_3$ can be a distribution of RSRP.

In addition, Step S33 can include adjusting the reconfigurable intelligent surface parameter 510 through the graphical user interface 500 by the processor. In FIG. 8, the reconfigurable intelligent surface parameter 510 can include an operating frequency, a size, an incidence angle, a reflection angle, a beam width, a reflection coefficient and a transmission coefficient corresponding to the reconfigurable intelligent surface 420 by the processor. Thus, the receiving power distribution constructing method 300 of the present disclosure can use the graphical user interface 500 to flexibly set the reconfigurable intelligent surface parameter 510 to change the propagation characteristics of the reconfigurable intelligent surface 420. Therefore, the electromagnetic field simulation software can be applied to more practical communication scenarios, such as multi-path reflection, multi-beam feed into RIS, and multi-RIS application scenarios.

In summary, the establishing method, the establishing system and the receiving power distribution constructing method of the present disclosure have the following advantages.

1. By embedding the reconfigurable intelligent surface radio frequency model into the electromagnetic field simulation software, highly accurate electromagnetic field estimation can be performed on the simulated electromagnetic field with the reconfigurable intelligent surface.

2. The first and second wireless transmission equations are used to calculate the receiving powers, and the relay gain is extracted through the link budget, and then the error term is corrected based on the loss correction value to establish the reconfigurable intelligent surface radio frequency model with high accuracy, so it can avoid the problem of mutual coupling effect affecting accuracy.

3. Setting different reconfigurable intelligent surface parameter through the embedded graphical user interface allows the electromagnetic field simulation software to consider more actual communication scenarios, such as multi-path reflection, multi-beam feed into RIS, and multi-RIS application scenarios.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An establishing method of a reconfigurable intelligent surface radio frequency model, comprising:
    calculating a first power ratio between a first receiving power of a first receiving antenna and a first transmitting power of a first transmitting antenna in a first wireless transmission module according to a first wireless transmission equation by a processor;
    calculating a second power ratio between a second receiving power of a second receiving antenna and a second transmitting power of a second transmitting antenna in a second wireless transmission module according to a second wireless transmission equation by the processor, wherein a reconfigurable intelligent surface is disposed between the second transmitting antenna and the second receiving antenna, and separated from the second transmitting antenna by a reference distance;
    calculating the first power ratio, the second power ratio and a path loss corresponding to the reference distance to obtain a relay gain of the reconfigurable intelligent surface by the processor; and establishing the reconfigurable intelligent surface radio frequency model based on a loss correction value and the relay gain by the processor;

wherein the reconfigurable intelligent surface radio frequency model is configured to analyze a receiving power distribution of the second wireless transmission module.

2. The establishing method of the reconfigurable intelligent surface radio frequency model of claim 1, wherein the first wireless transmission equation is a friis equation, and the second wireless transmission equation is a radar equation.

3. The establishing method of the reconfigurable intelligent surface radio frequency model of claim 1, wherein the first transmitting antenna is the same as the second transmitting antenna, and the first receiving antenna is the same as the second receiving antenna.

4. The establishing method of the reconfigurable intelligent surface radio frequency model of claim 1, further comprising:

setting the first transmitting power of the first transmitting antenna by the processor before calculating the first power ratio;

transmitting a first wireless signal to the first receiving antenna based on the first transmitting power by the first transmitting antenna; and measuring the first wireless signal received by the first receiving antenna from the first transmitting antenna by a measuring device to generate the first receiving power of the first receiving antenna.

5. The establishing method of the reconfigurable intelligent surface radio frequency model of claim 4, wherein the first transmitting antenna is separated from the first receiving antenna by a given distance, the first wireless transmission equation comprises the first transmitting power and a first transmitting gain of the first transmitting antenna, the first receiving power and a first receiving gain of the first receiving antenna, the given distance and a wavelength of the first wireless signal, and the following equations are satisfied:

$$P_r = \frac{P_{tFriss} \cdot G_t \cdot G_r \cdot \lambda^2}{(4\pi \cdot R_r)^2}; \text{ and}$$

$$\frac{P_r}{P_{tFriss}} = \frac{G_t \cdot G_r \cdot \lambda^2}{(4\pi \cdot R_r)^2};$$

wherein $P_r$ is the first receiving power, $P_{tFriss}$ is the first transmitting power, $G_t$ is the first transmitting gain, $G_r$ is the first receiving gain, $R_r$ is the given distance, and $\lambda$ is the wavelength of the first wireless signal, and $$\frac{P_r}{P_{tFriss}}$$

is the first power ratio.

6. The establishing method of the reconfigurable intelligent surface radio frequency model of claim 1, further comprising:

setting the second transmitting power of the second transmitting antenna by the processor before calculating the second power ratio;

transmitting a second wireless signal to the reconfigurable intelligent surface based on the second transmitting power by the second transmitting antenna;

re-radiating the second wireless signal to the second receiving antenna by the reconfigurable intelligent surface; and measuring the second wireless signal received by the second receiving antenna from the reconfigurable intelligent surface to generate the second receiving power of the second receiving antenna by a measuring device.

7. The establishing method of the reconfigurable intelligent surface radio frequency model of claim 6, wherein the reconfigurable intelligent surface is separated from the second receiving antenna by a given distance, and the second wireless transmission equation comprises the second transmitting power and a second transmitting gain of the second transmitting antenna, the second receiving power and a second receiving gain of the second receiving antenna, the given distance, the reference distance, a radar cross section of the reconfigurable intelligent surface and a wavelength of the second wireless signal, and the following equations are satisfied:

$$P_r = \frac{P_{tRadar} \cdot G_t \cdot G_r \cdot \lambda^2 \cdot \sigma}{(4\pi)^3 \cdot R_t^2 \cdot R_r^2}; \text{ and}$$

$$\frac{P_r}{P_{tRadar}} = \frac{G_t \cdot G_r \cdot \lambda^2 \cdot \sigma}{(4\pi)^3 \cdot R_t^2 \cdot R_r^2};$$

wherein $P_r$ is the second receiving power, $P_{tRadar}$ is the second transmitting power, $G_t$ is the second transmitting gain, $G_r$ is the second receiving gain, $R_r$ is the given distance, $R_t$ is the reference distance, and $\lambda$ is the wavelength of the second wireless signal, $\sigma$ is the radar cross section of the reconfigurable intelligent surface, and $$\frac{P_r}{P_{tRadar}}$$

is the second power ratio.

8. The establishing method of the reconfigurable intelligent surface radio frequency model of claim 1, wherein calculating the first power ratio, the second power ratio and the path loss corresponding to the reference distance to obtain the relay gain of the reconfigurable intelligent surface by the processor comprises:

subtracting the first power ratio from the second power ratio to generate a difference by the processor;

calculating the path loss corresponding to the reference distance according to a path loss model by the processor; and calculating the relay gain according to the difference and the path loss by the processor.

9. The establishing method of the reconfigurable intelligent surface radio frequency model of claim 8, wherein the path loss model comprises the reference distance and a frequency of a second wireless signal transmitted by the second transmitting antenna, and the following equation is satisfied:

$$FSPL_{R_t}(\text{dB}) = 20\log(R_t) + 20\log(f) + 20\log\left(\frac{4\pi}{c}\right);$$

wherein $R_r$ is the reference distance, f is the frequency of the second wireless signal, and c is a speed of light, and $FSPL_{R_t}$ (dB) is the path loss corresponding to the reference distance.

10. An establishing system of a reconfigurable intelligent surface radio frequency model, comprising:
a first wireless transmission module comprising:
a first transmitting antenna; and
a first receiving antenna signally connected to the first transmitting antenna;
a second wireless transmission module comprising:
a second transmitting antenna;
a second receiving antenna signally connected to the second transmitting antenna; and
a reconfigurable intelligent surface disposed between the second transmitting antenna and the second receiving antenna, and separated from the second transmitting antenna by a reference distance;
a memory storing a first wireless transmission equation, a second wireless transmission equation and a loss correction value; and
a processor connected to the memory, the first wireless transmission module and the second wireless transmission module, and configured to implement an establishing method of the reconfigurable intelligent surface radio frequency model comprising:
calculating a first power ratio between a first receiving power of the first receiving antenna and a first transmitting power of the first transmitting antenna according to the first wireless transmission equation;
calculating a second power ratio between a second receiving power of the second receiving antenna and a second transmitting power of the second transmitting antenna according to the second wireless transmission equation;
calculating the first power ratio, the second power ratio and a path loss corresponding to the reference distance to obtain a relay gain of the reconfigurable intelligent surface; and
establishing the reconfigurable intelligent surface radio frequency model based on the loss correction value and the relay gain;
wherein the reconfigurable intelligent surface radio frequency model is configured to analyze a receiving power distribution of the second wireless transmission module.

11. The establishing system of the reconfigurable intelligent surface radio frequency model of claim 10, wherein the first wireless transmission equation is a friis equation, and the second wireless transmission equation is a radar equation.

12. The establishing system of the reconfigurable intelligent surface radio frequency model of claim 10, wherein the first transmitting antenna is the same as the second transmitting antenna, and the first receiving antenna is the same as the second receiving antenna.

13. The establishing system of the reconfigurable intelligent surface radio frequency model of claim 10, wherein the processor sets the first transmitting power of the first transmitting antenna, the first transmitting antenna transmits a first wireless signal to the first receiving antenna based on the first transmitting power, and the establishing system of the reconfigurable intelligent surface radio frequency model further comprises:
a measuring device measuring the first wireless signal received by the first receiving antenna from the first transmitting antenna to generate the first receiving power of the first receiving antenna.

14. The establishing system of the reconfigurable intelligent surface radio frequency model of claim 13, wherein the first transmitting antenna is separated from the first receiving antenna by a given distance, the first wireless transmission equation comprises the first transmitting power and a first transmitting gain of the first transmitting antenna, the first receiving power and a first receiving gain of the first receiving antenna, the given distance and a wavelength of the first wireless signal, and the following equations are satisfied:

$$P_r = \frac{P_{tFriss} \cdot G_t \cdot G_r \cdot \lambda^2}{(4\pi \cdot R_r)^2}; \text{ and}$$

$$\frac{P_r}{P_{tFriss}} = \frac{G_t \cdot G_r \cdot \lambda^2}{(4\pi \cdot R_r)^2};$$

wherein $P_r$ is the first receiving power, $P_{tFriss}$ is the first transmitting power, $G_t$ is the first transmitting gain, $G_r$ is the first receiving gain, $R_r$ is the given distance, and $\lambda$ is the wavelength of the first wireless signal, and $$\frac{P_r}{P_{tFriss}}$$

is the first power ratio.

15. The establishing system of the reconfigurable intelligent surface radio frequency model of claim 10, wherein the processor sets the second transmitting power of the second transmitting antenna, the second transmitting antenna transmits a second wireless signal to the reconfigurable intelligent surface based on the second transmitting power, the reconfigurable intelligent surface re-radiates the second wireless signal to the second receiving antenna, and the establishing system of the reconfigurable intelligent surface radio frequency model further comprises:
a measuring device measuring the second wireless signal received by the second receiving antenna from the reconfigurable intelligent surface to generate the second receiving power of the second receiving antenna.

16. The establishing system of the reconfigurable intelligent surface radio frequency model of claim 15, wherein the reconfigurable intelligent surface is separated from the second receiving antenna by a given distance, and the second wireless transmission equation comprises the second transmitting power and a second transmitting gain of the second transmitting antenna, the second receiving power and a second receiving gain of the second receiving antenna, the given distance, the reference distance, a radar cross section of the reconfigurable intelligent surface and a wavelength of the second wireless signal, and the following equations are satisfied:

$$P_r = \frac{P_{tRadar} \cdot G_t \cdot G_r \cdot \lambda^2 \cdot \sigma}{(4\pi)^3 \cdot R_t^2 \cdot R_r^2}; \text{ and}$$

$$\frac{P_r}{P_{tRadar}} = \frac{G_t \cdot G_r \cdot \lambda^2 \cdot \sigma}{(4\pi)^3 \cdot R_t^2 \cdot R_r^2};$$

wherein $P_r$ is the second receiving power, $P_{tRadar}$ is the second transmitting power, $G_t$ is the second transmitting gain, $G_r$ is the second receiving gain, $R_r$ is the given distance, $R_t$ is the reference distance, and $\lambda$ is the wavelength of the second wireless signal, $\sigma$ is the radar cross section of the reconfigurable intelligent surface, and $$\frac{P_r}{P_{tRadar}}$$

is the second power ratio.

17. The establishing system of the reconfigurable intelligent surface radio frequency model of claim 10, wherein the memory further stores a path loss model, the processor subtracts the first power ratio from the second power ratio to generate a difference and calculates the path loss corresponding to the reference distance according to the path loss model, and the processor calculates the relay gain according to the difference and the path loss.

18. The establishing system of the reconfigurable intelligent surface radio frequency model of claim 17, wherein the path loss model comprises the reference distance and a frequency of a second wireless signal transmitted by the second transmitting antenna, and the following equation is satisfied:

$$FSPL_{R_t}(\text{dB}) = 20\log(R_t) + 20\log(f) + 20\log\left(\frac{4\pi}{c}\right);$$

wherein $R_t$ is the reference distance, f is the frequency of the second wireless signal, and c is a speed of light, and $FSPL_{R_t}$ (dB) is the path loss corresponding to the reference distance.

19. A receiving power distribution constructing method of a simulated electromagnetic field with a reconfigurable intelligent surface, comprising:
    calculating a first power ratio between a first receiving power of a first receiving antenna and a first transmitting power of a first transmitting antenna in a first wireless transmission module according to a first wireless transmission equation by a processor;
    calculating a second power ratio between a second receiving power of a second receiving antenna and a second transmitting power of a second transmitting antenna in a second wireless transmission module according to a second wireless transmission equation by the processor, wherein the reconfigurable intelligent surface is disposed between the second transmitting antenna and the second receiving antenna, and separated from the second transmitting antenna by a reference distance;
    calculating the first power ratio, the second power ratio and a path loss corresponding to the reference distance to obtain a relay gain of the reconfigurable intelligent surface by the processor;
    establishing a reconfigurable intelligent surface radio frequency model based on a loss correction value and the relay gain by the processor;
    importing a reconfigurable intelligent surface parameter and the reconfigurable intelligent surface radio frequency model corresponding to the reconfigurable intelligent surface into an electromagnetic field simulation software through a graphical user interface by the processor;
    executing the electromagnetic field simulation software to deploy the simulated electromagnetic field with the reconfigurable intelligent surface and a wireless transmitter based on the reconfigurable intelligent surface parameter by the processor;
    executing the electromagnetic field simulation software to create a first receiving power distribution corresponding to the wireless transmitter transmitting a simulated wireless signal by the processor;
    executing the electromagnetic field simulation software to create a second receiving power distribution corresponding to the simulated wireless signal re-radiated through the reconfigurable intelligent surface according to the reconfigurable intelligent surface parameter and the reconfigurable intelligent surface radio frequency model by the processor; and
    executing the electromagnetic field simulation software to superimpose the first receiving power distribution and the second receiving power distribution to construct a field receiving power distribution corresponding to the simulated electromagnetic field by the processor.

20. The receiving power distribution constructing method of the simulated electromagnetic field with the reconfigurable intelligent surface of claim 19, wherein importing the reconfigurable intelligent surface parameter and the reconfigurable intelligent surface radio frequency model corresponding to the reconfigurable intelligent surface into the electromagnetic field simulation software through the graphical user interface by the processor comprises:
    adjusting the reconfigurable intelligent surface parameter through the graphical user interface by the processor, wherein the reconfigurable intelligent surface parameter comprises an operating frequency, a size, an incidence angle, a reflection angle, a beam width, a reflection coefficient and a transmission coefficient corresponding to the reconfigurable intelligent surface.

* * * * *